(12) United States Patent
Jayawant et al.

(10) Patent No.: US 10,349,226 B2
(45) Date of Patent: Jul. 9, 2019

(54) SYSTEM AND METHOD FOR PROVIDING DATA

(71) Applicant: EUREKA MOBILE ADVERTISING LIMITED, Middlesex (GB)

(72) Inventors: Rahul Jayawant, Middlesex (GB); Rohan Jayawant, Middlesex (GB); Yogesh Sholapurkar, Middlesex (GB)

(73) Assignee: Eureka Mobile Advertising Limited, Middlesex (GB)

( * ) Notice: Subject to any disclaimer, the term of this patent is extended or adjusted under 35 U.S.C. 154(b) by 626 days.

(21) Appl. No.: 14/438,067

(22) PCT Filed: Oct. 23, 2013

(86) PCT No.: PCT/GB2013/052759
§ 371 (c)(1),
(2) Date: Apr. 23, 2015

(87) PCT Pub. No.: WO2015/059434
PCT Pub. Date: Apr. 30, 2015

(65) Prior Publication Data
US 2016/0044468 A1    Feb. 11, 2016

(30) Foreign Application Priority Data
Oct. 23, 2012    (GB) .................................. 1219026.0

(51) Int. Cl.
*G06Q 30/02*    (2012.01)
*H04W 4/06*    (2009.01)
*H04W 4/021*    (2018.01)

(52) U.S. Cl.
CPC .......... *H04W 4/06* (2013.01); *G06Q 30/0257* (2013.01); *G06Q 30/0267* (2013.01); *H04W 4/021* (2013.01)

(58) Field of Classification Search
CPC ............................... G06Q 30/00; G06Q 30/02
(Continued)

(56) References Cited

U.S. PATENT DOCUMENTS

2009/0055270 A1\*  2/2009  Magdon-Ismail ........................ G06F 17/30899
705/14.27
2009/0253442 A1  10/2009  Borrillo et al.
(Continued)

FOREIGN PATENT DOCUMENTS

EP       1592267 A2   11/2005
WO    2009005865 A2    1/2009
(Continued)

OTHER PUBLICATIONS

International Search Report for International Application No. PCT/GB2013/052759, dated Aug. 4, 2014, 11 pages.
(Continued)

*Primary Examiner* — Marilyn G Macasiano
(74) *Attorney, Agent, or Firm* — Fredrikson & Byron, P.A.

(57) ABSTRACT

A system and method for the delivery and display of information, including an information inventory containing information to be delivered, an information serving engine, a targeting engine, a subscriber database and a subscriber-information matching arrangement, the system and method configured for the delivery of information based on various factors.

20 Claims, 2 Drawing Sheets

(58) Field of Classification Search
USPC .......................... 705/14.16, 14.27; 715/833
See application file for complete search history.

(56) References Cited

U.S. PATENT DOCUMENTS

| | | |
|---|---|---|
| 2010/0035656 A1 | 2/2010 | Pan |
| 2010/0083280 A1 | 4/2010 | Schwarzberg |
| 2010/0222046 A1 | 9/2010 | Cumming |
| 2011/0093320 A1* | 4/2011 | Blake .................... G06Q 30/02 |
| | | 705/14.16 |
| 2012/0259707 A1 | 10/2012 | Thielke et al. |
| 2013/0239058 A1* | 9/2013 | Yao .................... G06F 3/04883 |
| | | 715/833 |

FOREIGN PATENT DOCUMENTS

| | | |
|---|---|---|
| WO | 2009120597 A1 | 10/2009 |
| WO | 2011047106 A2 | 4/2011 |

OTHER PUBLICATIONS

Search Report Under Section 17 for Application No. GB1219026.0, 1 page, dated Feb. 20, 2013.

* cited by examiner

SYSTEM AND METHOD FOR PROVIDING DATA

RELATED APPLICATIONS

This application is a 35 U.S.C. 371 national stage filing from International Application No. PCT/GB2013/052759, filed 23 Oct. 2013 and claims priority to British Application No. 1219026.0, filed 23 Oct. 2012, the teachings of each of which are incorporated herein by reference.

DESCRIPTION OF INVENTION

The present invention relates to a system and method for the provision of data, and more specifically, a system and method for the efficient provision of data in a mobile or cellular environment.

Particularly, it is desirable to be able to provide targeted data messages to mobile or cellular subscribers. It is also desirable to tailor the content of the messages in dependence upon pre-set conditions, such that relevant information is made available to a subscriber.

Additionally, it is desirable to be able to provide targeted information notices to mobile subscribers, based on real-time events. Particularly, it is desirable to provide information which has direct relevance to the daily activity or activities of a mobile subscriber.

The present invention seeks to provide a system and method to allow targeted data to be transmitted to subscribers in a mobile or cellular environment.

Accordingly, the present invention provides a system for delivering information to a handheld device, the system comprising an information inventory containing information to be delivered, an information serving engine, a targeting engine, a subscriber database and a subscriber-information matching arrangement, wherein the subscriber database contains information about subscribers to which information is to be provided, and the targeting engine is configured to determine which information is to be provided to which subscribers and at what time and/or date, based on information regarding the subscribers stored in the subscriber database, the subscriber-information matching arrangement takes the information to be delivered during a predetermined period and the selected subscribers and matches them together, and the information to be delivered during the predetermined period is delivered to the selected subscribers by transmitting the information to the handheld device at a time of low network usage, and the information includes display schedule data, instructing that the information is displayed to the subscriber on the handheld device at the set times and/or dates, to be viewed by the subscriber.

Preferably, the information is delivered via a cellular network.

Alternatively, the information is delivered via a wi-fi network.

Conveniently, the handheld device is a cellular telephone.

Alternatively, the handheld device is a tablet.

Advantageously, a subscriber may opt in to the information delivery system.

Preferably, the information regarding the subscribers includes demographic information.

Conveniently, the information to be delivered is provided by an external party.

Advantageously, the system further includes an action log, and when the information is viewed by the subscriber, a read acknowledgement is sent to the action log.

Preferably, the or each set time is not the same as the predetermined delivery period.

Conveniently, the information further includes a data flag which causes the information to be displayed when the handheld device is unlocked, altering the normal user navigation of the handheld device.

Advantageously, the data flag causes the information to be displayed on the screen of the handheld device immediately after the lock screen is dismissed, altering the normal user navigation of the handheld device.

Alternatively, the data flag is set such that the subscriber must indicate that they have read the information prior to the information being removed from the screen of the handheld device.

Alternatively, the information further includes a data flag which causes the information to be displayed when a call is dismissed on the handheld device.

Preferably, the information to be delivered includes a network service message.

Preferably, the information to be delivered includes a software update alert.

Conveniently, the information to be delivered includes a traffic or news alert.

Advantageously, the information to be delivered includes advertisements.

Alternatively, the information to be delivered includes marketing communications and/or marketing information.

Another aspect of the present invention provides a combination of the system of any preceding claim and a handheld device, wherein the handheld device includes an application configured to receive and display the information delivered by the system, and wherein the application is configured to display the information according to the display schedule data.

Preferably, the application determines when the information is to be displayed on the device.

Conveniently, the application is configured to display the information on a post-lock screen.

Advantageously, the post-lock screen is an idle screen on the handheld device.

A further aspect of the present invention provides a method for delivering information, the method comprising providing information to be delivered, stored in an information inventory, to be delivered by an information serving engine, analysing information stored in a subscriber database about subscribers to which information is to be provided, determining which information is to be provided to which subscribers and at what time and/or date by way of a targeting engine, the determination based on information regarding the subscribers stored in the subscriber database and the information stored in the information inventory, providing a subscriber-information matching arrangement which determines which information is to be delivered during a predetermined period, taking the information to be delivered during the predetermined period and the selected subscribers and matching them together, determining when network usage is low, delivering the information to be displayed during the predetermined period to the selected subscribers by transmitting the information to a handheld device at the determined time of low network usage, including, in the information, display schedule data which instructs a handheld device to display the information and displaying the information to a subscriber on a handheld device at the set times and/or dates, to be viewed by the subscriber.

Preferably, the information is delivered via a cellular network.

Alternatively, the information is delivered via a cellular network.

Conveniently, the handheld device is a cellular telephone.

Alternatively, the handheld device is a tablet.

Advantageously, the method further includes the further step of receiving a request, from a subscriber, to opt in to receive information.

Preferably, the information regarding the subscribers includes demographic information.

Conveniently, the method further includes the step of receiving the information to be delivered from an external party.

Advantageously, the method further includes the step of receiving a read acknowledgement from a handheld device when information is read by a subscriber, and storing the acknowledgement in an action log.

Preferably, the or each set time is not the same as the predetermined delivery period.

Conveniently, the method further includes the step of including a data flag with the information which causes the information to be displayed when the handheld device is unlocked, altering the normal user navigation of the handheld device.

Advantageously, the data flag causes the information to be displayed on the screen of the handheld device immediately after the lock screen is dismissed, altering the normal user navigation of the handheld device.

Preferably, the data flag is set such that the subscriber must indicate that they have read the information prior to the information being removed from the screen of the handheld device.

Alternatively, the method further includes the step of including a data flag with the information which causes the information to be displayed when a call is dismissed on the handheld device.

Conveniently, the information to be delivered includes a network service message.

Preferably, the information to be delivered includes a software update alert.

Conveniently, the information to be delivered includes a traffic or news alert.

Advantageously, the information to be delivered includes advertisements.

Alternatively, the information to be delivered includes marketing communications and/or marketing information.

The present invention will now be described with reference to the accompanying figures, in which.

Figure 1:
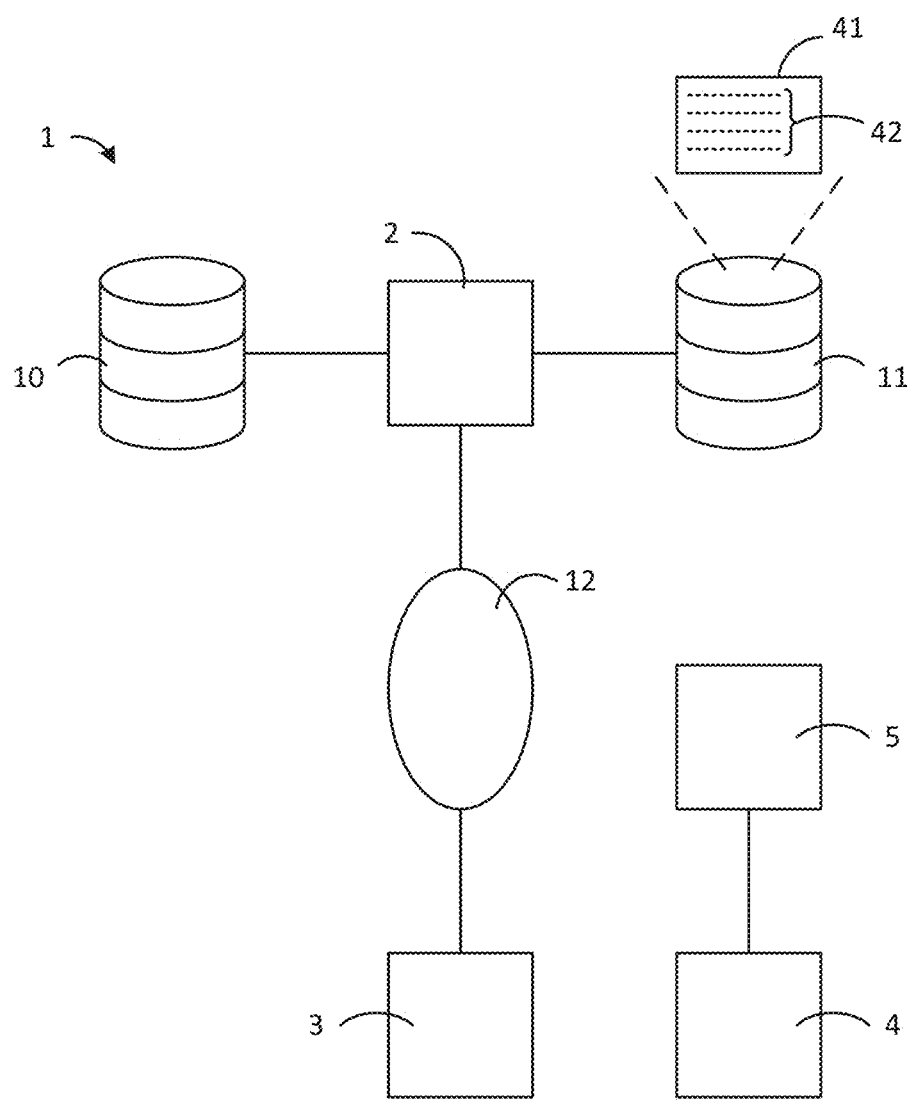
FIG. 1 shows a schematic representation of a data providing system.

Turning firstly to FIG. 1, a schematic representation of the system 1 which embodies the present invention is shown. The system 1 may include a targeting engine 2, an information serving engine 3, an action log 4, an analytics engine 5, a subscriber database 10, an information inventory 11 and a subscriber-information matching arrangement 12. The subscriber-information matching arrangement 12 may include a result set which has been created by the targeting engine 2, which may match information from the information inventory 11 with subscriber demographic data (discussed later) from the subscriber database 10.

Figure 2:
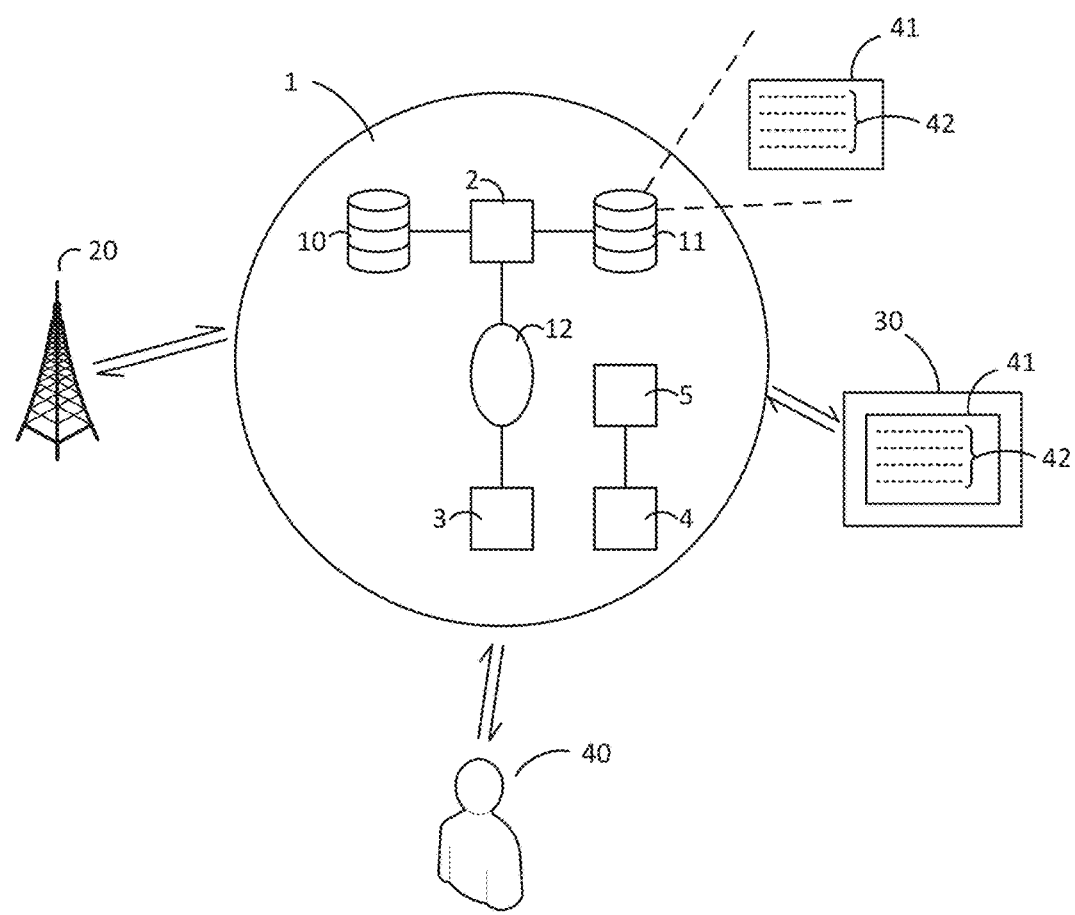
FIG. 2 shows a schematic representation of a data providing system with further infrastructure attached.

FIG. 2 shows the system 1 of FIG. 1 connected to a telecoms operator 20, an information provider 30 and a subscriber 40. The system 1 may be connected to each of these 20, 30, 40 by one- or two-way communication, and the telecoms operator 20 and subscriber 40 may also be connected outside of the system 1. In normal operating circumstances, the information provider 30 may not be connected directly to the operator 20 or subscriber 40 outside of the system 1.

Returning to a discussion of the system 1 shown in FIG. 1, the system 1 may be operable to transmit an information message 41 to the telecoms subscriber 40 (not shown). The information message 41 may include any type of data, and may include alerts or general information. The form and content of the information message 41 will be discussed in more detail later.

The system 1 may also be operable to direct particular information messages 41 to particular subscribers 40, dependent upon pre-set conditions. The way in which this message direction operates will be discussed briefly here, and in more detail below.

The information inventory 11 may be pre-loaded with information 41 to be provided to subscribers 40, or may be loaded with information on an ad-hoc basis. The information 41 may be provided by an information provider 30, and may also comprise a multitude of individual information items 42. The information provider 30 may load the information inventory 11 using an information loading system, which may take the form of a web portal or similar. The information provider 30 may identify details of the information 41, details of actions to be taken when a subscriber 40 interacts with the information 41 as well as provide scheduling data which may specify when that particular information 41 should be shown to a subscriber 40.

The information items 42 may be catalogued for ease of reference and location. The subscriber database 10 may include details of each subscriber on a cellular or mobile network, or only the details of subscribers who subscribe to the information provision system 1. The information provision service 1, by way of the information serving engine 3, action log 4, an analytics engine 5, and subscriber-information matching engine 12 is operable to provide the targeted information messages 41.

The information serving engine 3 may take information 42 from the information inventory 11, passed via the subscriber-information matching engine 12. The matching engine 12 may also take data from the subscriber database 10.

The information 42 may then be matched to a subscriber or subscribers 40, and readied for transmission from the system 1 to the subscriber or subscribers 40. The way in which the information 41 is transmitted to the subscriber or subscribers 40 will be discussed in more detail later.

Once the information 41 has been transmitted to a subscriber's handset or device, the information 41 may be presented to the subscriber 40. The information 41 that is transmitted may include multiple messages or items of data 42, and may be displayed at particular times or on particular dates. If this is the case, the time and/or date of display of the data may be set by the targeting engine 2. Alternatively, the system 1 may further include a scheduling engine 50, which may determine which information 41, 42 is shown at what time and/or in what sequence to the subscriber 40.

In some embodiments of the invention, the information 41, 42 may be displayed on the screen of a subscriber's handset or device at a pre-set time, regardless of the current state of operation of the subscriber's device. This may cause the information 41, 42 to be displayed in place of the current screen contents, and the device may not be returned to normal operation until the subscriber 40 has viewed the information 41, 42 as detailed below. In other embodiments of the invention, the information 41, 42 may be displayed on a 'post-lock' screen.

The 'post-lock' screen may be a device 'idle screen'. The device may be maintained in an idle state whilst the post-lock screen is displayed.

If the information 41, 42 is displayed on such a post-lock screen, the information 41, 42 may be presented to a subscriber on the screen of their handset or device when the device is powered up, immediately after the handset is 'unlocked' or brought out of standby. Many popular handsets presently employ a 'swipe to unlock' feature, or may require a PIN or alphanumeric code to be entered to unlock the handset. In the case of Android® handsets, the user may be required to swipe their finger in a particular pattern upon the screen to unlock the device.

After the handset or device is unlocked, the information 41, 42 may then immediately be displayed on the screen of the handset or device, such that a subscriber must view the information 41, 42 before being able to access the unlocked device to continue normal operation. Such a method of information 41, 42 display alters the user navigation of a handset or device, preventing normal operation of the device from occurring until the subscriber 40 has viewed the information 41, 42, discussed in more detail below. Such alteration of the user navigation of a device may also ensure that a subscriber 40 sees the information 41, 42. Further, an alert may be displayed on the lock screen of the handset or device, to alert the subscriber that there is information 41, 42 to be viewed on unlocking the handset or device.

The information 41, 42 may include a selection of options that a subscriber 40 may be presented with. These options may include (but are not limited to) touching the screen when the information is shown, which may in turn launch a browser window to route the subscriber 40 to a pre-determined link that was specified as part of the information 41, 42.

Further, the subscriber 40 can dismiss the information 41, 42 by swiping the screen, or, alternatively, by selecting a dismiss option which may be presented. This may then allow the subscriber 40 to continue normal operation of the device and may return the user navigation of the device to a normal state. A contextual menu may be launched by clicking on the Menu button of the device. 'Show me later', 'save', 'like' and 'share' functions may also be provided. 'Show me later' may queue the information 41, 42 behind the next piece of information 41, 42 scheduled to be shown to the subscriber at that point in time, or may be configured such that the information is shown again after unlocking the device, after a pre-determined period. If a subscriber 40 indicates that they would like to save the information to view later, the information may be saved in the application for off-line or later viewing. The 'like' and 'share' option may be used to allow a subscriber 40 respectively to indicate that they like the content of the information 41, 42, or may forward the information 41, 42 to another subscriber 40.

If the information is shown on a post-lock screen, this may ensure that the information 41, 42 is delivered to and viewed by a subscriber 40, but also that the subscriber 40 is not inconvenienced by the display of the information 41, 42. Further, if the information 41, 42 is displayed immediately after the handset or device is unlocked, it may be possible to track whether a subscriber 40 has viewed the information 41, 42, and the time/date at which the information 41, 42 was viewed by the subscriber.

The information 41, 42 may also be displayed on the screen of the handset or device immediately following the ending of a call. If the information 41, 42 is displayed on a the screen of the device as soon as a call is ended, the information 41, 42 may be presented to a subscriber on the screen of their handset or device when the 'hang up' or 'end call' button or option is pressed or selected.

As with the methods of display of information 41, 42 detailed above, the display of the information 41, 42 alters the user navigation of a handset or device, preventing normal operation of the device from occurring until the subscriber 40 has viewed the information 41, 42, as detailed above.

The portion of the system 1 on the handset or device may keep data which includes a track of each action that the subscriber 40 takes with respect to the information 41, 42, and may log whether the subscriber 40 has viewed, dismissed or saved the information 41, 42, or whether the subscriber 40 has selected the 'show me later' option. The application may then push this data to the action log 4.

The data from the action log 4 may then be processed by the analytics engine 5. The processing steps undertaken by the analytics engine may include analysis as to whether a subscriber or subscribers like a particular information message, behavioural patterns of subscribers 40 dependent upon the information 41, 42 provided thereto, and demographic information regarding the subscribers 40 based upon the information 41, 42 provided thereto. Further, analysis may be undertaken regarding which information 41, 42 is particularly relevant to a particular group or groups of subscribers 40.

The analytics engine 5 may also analyse all the actions that the subscriber 40 performs in connection with each item of information 41, 42, which may include requests to 'show me later', 'share, 'dismiss' or 'save'.

The information inventory 11 may, in combination with the subscriber database 10 and the analytics engine 5, store and keep updated information regarding which information 41, 42 has been provided to certain subscribers 40, a log of which subscriber or subscribers 40 has viewed a particular item of information 41, 42, an inventory of the information items 41, 42 available, and may be operable to undertake reporting on such information (and further information, if required). This reporting will be discussed in more detail later.

The system 1 may also provide an application for a mobile device or handset which, when launched by a subscriber, may display the information 41, 42 which has been delivered to the device or handset, and may also include a selection of options that a subscriber 40 may be presented with. These options may include (but are not limited to) clicking a link in the information 41, 42, which may launch a browser window to provide further information.

'Show me later', 'save', 'like' and 'share' functions may also be provided, such that a subscriber may save the information to view later (it may be configured such that the information is shown again after unlocking the device, after a pre-determined period), indicate that they like the content of the information 41, 42, or may forward the information 41, 42 to another.

For a subscriber 40 to use the service 1, the user may have to download the application to their handset or device. The subscriber may be presented with terms and conditions which may have to be accepted to commence use of the service 1. Information 41, 42 may not be provided to a subscriber 40 if they have not accepted the terms and conditions.

The application 1 may further enable a subscriber 40 to set up and/or edit details about them, which may be shared with the analytics engine 5, the subscriber-information engine 12 and any other appropriate part of the system 1. The subscriber 40 may input name, date of birth, age, email address, address, sex, contact details, interests, hobbies, and may also provide further information regarding the information 41, 42 that they may receive. The subscriber 40 may also pause the provision of information 41, 42, and/or may indicate further factors about themselves that may ensure that more important or pertinent information 41, 42 is provided to them.

The application for a handset or device may be made available online for download, and dependent upon the platform on which the application is to be provided, may take any suitable format. In the case of an Android® application, it may be delivered by way of an Android Package (or APK) file, either via the Google® Play Store® or from a download area independent of Google®.

The telecoms operator 20 or information provider 30 (or any other interested party) may undertake reporting on the system 1. The reports may include information regarding the number of information messages provided, the number of information messages viewed by a subscriber or subscribers 40, the content of the viewed information messages, the number of times that the further information link is viewed, the number of times a particular subscriber 40 has viewed a post-lock screen, the identification number or numbers of a particular subscriber 40, and whether a particular subscriber is presently accepting information 41, 42, and for how long they have been accepting information 41, 42.

Further, reports may be generated regarding particular information messages. The report may include the name of the information message, the number of times on which the message has been clicked, the number of times that the message has been liked, shared or saved for later, the identities of subscribers 40 who have viewed the message, and other relevant information.

It is to be understood that other reports may be generated which may include information available in the system 1. Reports may take any suitable format, and may be provided in any appropriate way.

Subscribers 40 may join the system 1 in a variety of ways, or may be automatically enrolled by a telecoms operator 20. A subscriber 40 may access a webpage to enroll in the service, and may be required to provide at least some of the information which is editable in the application, as discussed above. If a subscriber 40 is to be automatically enrolled in the system 1 by a telecoms operator 20, the operator 20 may provide the relevant details of the subscriber 40, which again may be at least some of the information editable in the application, discussed above.

Further, the telecom operator 20 may provide further information, which may be received by the system 1. This may be of particular relevance if the telecom operator 20 is providing the subscriber 40 information, and may include details of new subscribers, modified subscribers and deleted subscribers, and, as mentioned above, data regarding the subscribers which may include name, age, date of birth, email address, address, sex and contact details, and may also provide further information regarding the information 41, 42 that the subscriber is to receive.

The information 41, 42 is not necessarily provided to a subscriber's handset or device at the time that the information is to be shown. Instead, the information 41, 42 to be shown over a pre-set period may be aggregated, and queued for delivery to a subscriber or subscribers 40. Therefore, the information for provision on a particular day may be transmitted at times of low network usage, for instance during the early hours of the morning (for instance between the hours of 2 am and 4 am), to reduce the load on a cellular network. Such times of low network usage may ensure that the information 41, 42 is delivered quickly and without errors, and will be available for display at times when network usage may be high, for instance during peak commuter hours in the morning.

Further, if the information 41, 42 to be displayed over the course of a day is pushed to a subscriber's handset or device during times of low network usage, often at night, if the user has no cellular or data signal during the day when the information 41, 42 is to be displayed, the information 41, 42 may still be displayed to the subscriber, regardless of signal availability. This may ensure that a subscriber sees the information 41, 42 scheduled for display during the course of that day.

Also, if the information 41, 42 is pushed to a subscriber's handset or device during a time of low network usage, with the information 41, 42 subsequently presented, by way of a post-lock screen to a subscriber, the subscriber may be more likely to read and understand the content of each item of information 41, 42 if they are presented to the subscriber during the course of a day—the subscriber may be less likely to read and understand the content of the information 41, 42 if the information 41, 42 is presented to the user all at the same time.

During the daytime, and particularly during so-called 'peak' hours, cellular data usage is generally high, and the provision of information 41, 42 during these hours would place further load on a cellular data network, and, in some events, at times of high traffic, information 41, 42 may be delayed significantly and not provided at the appropriate time. If the information 41, 42 is provided to the device in this at times of low network usage, it may be ensured that even if a network failure occurs, the information 41, 42 is available to the subscriber.

In an effort to reduce the load on cellular networks, the system 1 of the present invention may transmit information 41, 42, as discussed above, to a subscriber's handset or device in bulk, and the information 41, 42 transmitted may be a combination of all of the information to be viewed in one particular day or pre-set time period. Of course, if further, real-time information is to be provided, further information 41, 42 may be provided to a subscriber 40 on an ad-hoc basis. Such information 41, 42 may be integrated into the display schedule as appropriate.

The system 1 may perform analysis on data transfer and bandwidth usage for a particular cellular network or telecoms operator's 20 infrastructure, and may determine the most appropriate time for transmission of information 41, 42, which may be the period at which network or cellular traffic is at its lowest.

It is envisaged that such an information provision system 1 could be used to provide targeted advertisements in a cellular environment, to provide effective delivery of targeted advertisements to subscribers 40 who opt in to such a service. The data received by the action log 4 and analytics engine 5 could be used to recompense or provide rewards to subscribers 40 who view advertisements provided by the system.

Additionally, it is proposed that such an information provision system 1 could be used to provide important information 41, 42 to employees of a company. Such information 41, 42 may be provided as part of a 'closed loop' corporate communication system.

It is envisaged that handsets or devices provisioned or provided by the company may have the application installed, with the system 1 configured to provide daily information 41, 42 updates to employees of the company, who are effectively subscribers 40. The information provided to employees of the company may include daily announcements, sales opportunities, cross-selling opportunities, HR announcements, general updates or any other useful information 41, 42.

Additionally, suppliers, vendors and customers may be included as subscribers 40 of the system 1, with the information provided thereto tailored to their particular role or position.

As detailed above, the information 41, 42 may be shown immediately after the handset or device is unlocked. In this way, as discussed above, the information 41, 42 may immediately be displayed on the screen of the handset or device, prior to normal operation of the device, such that the employee must view the information 41, 42 before being able to access the unlocked device to continue normal operation. This, as discussed above, alters the normal user operation of the handset or device. Alternatively, the information 41, 42 may be shown in accordance with the methods detailed above.

Such methods of information 41, 42 display ensure that employees see and acknowledge the information 41, 42, as it is shown on their device without the employee seeking to view the information 41, 42 or having to actively launch an application on their handset or device to view the information 41, 42.

It is envisaged that the 'share' and 'like' features outlined above would not be included for information 41, 42 provided to company employees, suppliers, vendors and/or customers as part of a closed-loop information provision system 1.

The information 41, 42 provided to one group of subscribers 40, for instance vendors, may be confidential or commercially sensitive.

In general, the system 1 may be used to deliver updates during the course of a day, with the information 41, 42 being delivered at times of low network usage as detailed above, to ensure that the information 41, 42 is available to employees at the start of a day.

However, in addition to this, the system 1 may be used to provide information 41, 42 to company employees in realtime, with information 41, 42 being delivered to employees' handsets or devices in the event of system or server failure, or if an urgent alert or updated must be provided.

The implementation of the system 1 for providing information 41, 42 to employees may not require use of the targeting engine 2, as all employees may be required to receive and read the same information 41, 42. However, a targeting engine 2 may be used to ensure that the correct employees receive the correct information 41, 42.

Use of the system in general will now be described.

In use, the system 1 would be configured to connect with a telecoms operator or operators 20 and an information provider 30. The telecoms operator or operators 20 may provide information regarding subscribers 40 to the system, and the information would be stored in the subscriber database 10. An information provider 30 would also provide information to be sent to subscribers 40, which would be stored in the information inventory 11.

Dependent upon the content of the information inventory 11 and the subscriber details in the subscriber database 10, the subscriber-information matching engine 12 would match information to subscribers 40, and would pass the information 41, 42 to the information serving engine 3. The information 41, 42 may then be transmitted to a subscriber or subscribers' handset(s) or device(s), at a period of low cellular data usage. The information 41, 42 would then be delivered to the subscriber or subscribers 40 and would be displayed, via a post-lock screen, at times or at a schedule or in a sequence determined by the scheduling engine 50.

The or each handset or device would then provide information to the action log 4 and analytics engine 5, so that data regarding the information 41, 42 could be tracked.

Reports, as discussed above, could be run, to provide information regarding the usage of the system 1 and the behaviour of subscribers as a result of the information provided.

When the term 'idle screen' is used in this specification, it may include 'post-lock' screen, screen saver or background.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A system for delivering information to a handheld device, the system comprising:
   a subscriber database that contains information about subscribers to whom information is to be provided;
   a non-transitory machine-readable medium including instructions for operating a targeting engine and a subscriber-information matching engine such that, when executed:
   causes the targeting engine to determine which respective information is to be provided to which respective subscriber and during which respective predetermined period including a respective time and/or date, the determination based on subscriber information regarding the subscribers stored in the subscriber database;
   causes the subscriber-information matching engine to match each respective determined information to be delivered with each respective determined subscriber; and
   causes each respective determined information to be delivered during the respective predetermined period to the respective determined subscriber by transmission of the respective determined information to a respective handheld device of the respective determined subscriber at a time of low network usage; wherein
   the respective determined information includes display schedule data, instructing the respective handheld device to display the respective determined information at the respective determined times and/or dates; and
   each respective determined information includes a data flag that is configured to cause the respective handheld device to display the respective determined information after the respective handheld device has been unlocked, thereby altering a normal user navigation of a user interface of the respective handheld device.

2. The system of claim 1, wherein the respective determined information is to be delivered via at least one of: a cellular network and a wi-fi network.

3. The system of claim 1, wherein the respective handheld device is at least one of: a cellular telephone and a tablet.

4. The system of claim 1, further comprising an action log, wherein a read acknowledgement is sent to the action log, by the respective handheld device, upon the selection of the input mechanism.

5. The system of claim 1, wherein at least one of the respective determined times and/or dates is not the same as the predetermined delivery period.

6. The system of claim 1, wherein the respective handheld device is configured to display a lock screen prior to the respective handheld device being unlocked; and
   wherein the data flag is configured to cause the information to be displayed the respective handheld device immediately after the lock screen is dismissed, thus altering the normal user navigation of the user interface of the respective handheld device.

7. The system of claim 1, wherein
   the user interface of the respective handheld device includes a selectable input mechanism, that, when selected, causes the respective handheld device to not display the respective determined information; and
   the selectable input mechanism, when selected, indicates that the respective determined subscriber has viewed the respective determined information.

8. The system of claim 1, wherein the data flag is configured to cause the respective handheld device to display the respective determined information upon termination of a call.

9. The system of claim 1, wherein the respective determined information includes a network service message.

10. The system of claim 1, wherein the respective determined information includes at least one of: a software update alert, a traffic alert, a news alert, an advertisement, a marketing communication, and marketing information.

11. The system of claim 1, wherein the respective handheld device includes an application configured to receive and display the respective determined information delivered by the system, and wherein the application is configured to display the information according to the display schedule data.

12. The system of claim 11, wherein the application is configured to determine when to display the respective determined information on the respective handheld device.

13. The system of claim 11, wherein the application is configured to display the respective determined information on a post-lock screen.

14. A method for delivering information to a handheld device, the method comprising:
   providing information, stored in an information inventory, the information to be delivered by an information serving engine;
   analyzing subscriber information stored in a subscriber database about subscribers to whom the information is to be provided;
   determining which respective information is to be provided to which respective subscriber and during which respective predetermined period including a respective time and/or date, the determining based on the subscriber information and the information stored in the information inventory;
   matching each respective determined information to be delivered with each respective determined subscriber;
   determining when network usage is low; and
   delivering each respective determined information to the respective determined subscriber by transmitting the respective determined information to a respective handheld device of the respective determined subscriber at the determined time of low network usage;
   wherein each respective determined information includes a data flag that is configured to cause the respective handheld device to display the respective determined information after the respective handheld device has been unlocked, thereby altering a normal user navigation of a user interface of the respective handheld device; and
   wherein the user interface of the respective handheld device includes a selectable input mechanism, that, when selected, causes the respective handheld device to not display the respective determined information.

15. The method of claim 14, wherein the respective determined information is to be delivered via at least one of: a cellular network and a wi-fi network.

16. The method of claim 14, wherein the respective handheld device is at least one of: a cellular telephone and a tablet.

17. The method of claim 14, further comprising:
   receiving, upon the selection of the input mechanism, a read acknowledgement from the respective handheld device; and
   storing the read acknowledgement in an action log.

18. The method of claim 14, wherein at least one of the respective determined times and/or dates is not the same as the predetermined delivery period.

19. The method of claim 14, wherein the respective handheld device is configured to display a lock screen prior to the respective handheld device being unlocked; and
   wherein the data flag is configured to cause the information to be displayed on the screen of the respective handheld device immediately after the lock screen is dismissed, thus altering the normal user navigation of the user interface of the respective handheld device.

20. A method for delivering information to a handheld device, the method comprising:
   providing information, stored in an information inventory, the information to be delivered by an information serving engine;
   analyzing subscriber information stored in a subscriber database about subscribers to whom the information is to be provided;
   determining which respective information is to be provided to which respective subscriber and during which respective predetermined period including a respective time and/or date, the determining based on the subscriber information and the information stored in the information inventory;
   matching each respective determined information to be delivered with each respective determined subscriber;
   determining when network usage is low; and
   delivering each respective determined information to the respective determined subscriber by transmitting the respective determined information to a respective handheld device of the respective determined subscriber at the determined time of low network usage;
   wherein each respective determined information includes a data flag that is configured to cause the respective handheld device to display the respective determined information after the respective handheld device has been unlocked, thereby altering a normal user navigation of a user interface of the respective handheld device.

* * * * *